April 30, 1929.    J. G. PROSSER    1,711,249
METHOD AND APPARATUS FOR OBTAINING WORK IN INTERNAL COMBUSTION ENGINES
Filed Sept. 3, 1925    3 Sheets-Sheet 1
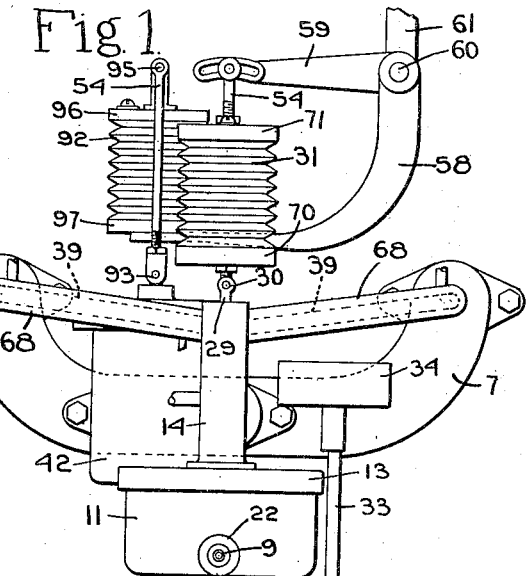
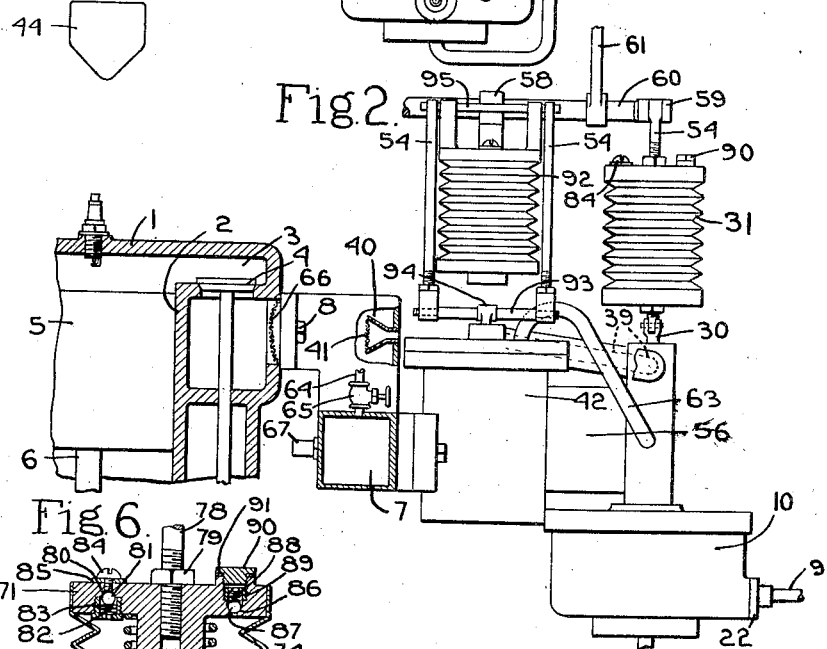
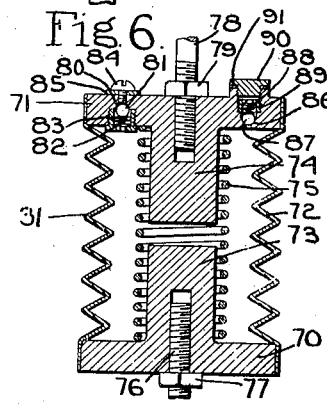
Inventor.
Joseph G. Prosser
by Heard Smith & Tennant.
Attys April 30, 1929.  J. G. PROSSER  1,711,249
METHOD AND APPARATUS FOR OBTAINING WORK IN INTERNAL COMBUSTION ENGINES
Filed Sept. 3, 1925   3 Sheets-Sheet 2
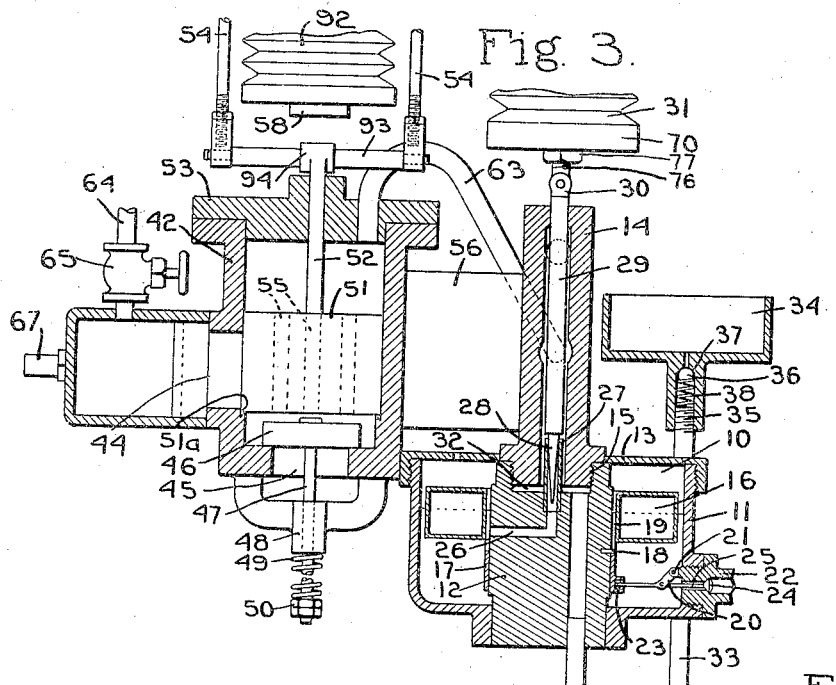
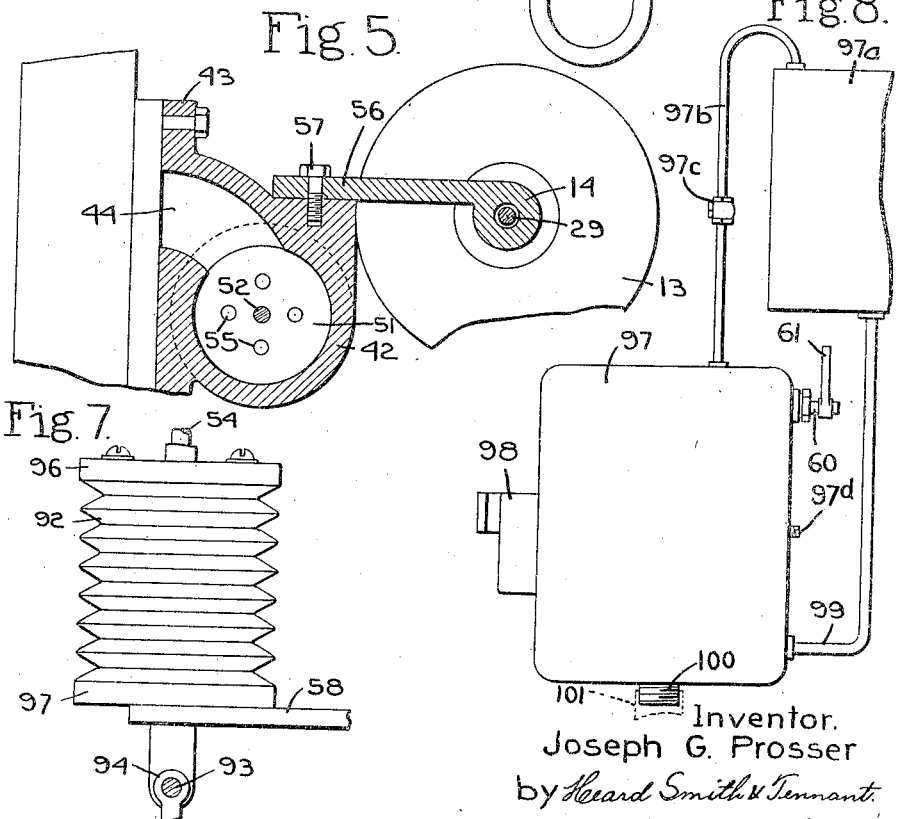
Inventor.
Joseph G. Prosser
by Heard Smith & Tennant.
Attys.

April 30, 1929.  J. G. PROSSER  1,711,249
METHOD AND APPARATUS FOR OBTAINING WORK IN INTERNAL COMBUSTION ENGINES
Filed Sept. 3, 1925  3 Sheets-Sheet 3

Inventor.
Joseph G. Prosser
by Heard Smith & Tennant.
Attys.

Patented Apr. 30, 1929.

1,711,249

UNITED STATES PATENT OFFICE.

JOSEPH G. PROSSER, OF CHICAGO, ILLINOIS.

METHOD AND APPARATUS FOR OBTAINING WORK IN INTERNAL-COMBUSTION ENGINES.

Application filed September 3, 1925. Serial No. 54,200.

This invention relates to a method or process for obtaining work from an internal combustion engine and also to means or apparatus by which the method or process may be accomplished.

The object of the invention is to provide a method or process for operating an internal combustion engine comprising a cylinder and piston by first varying the amount of hydrocarbon and air supplied to the cylinder in approximate correlation to the amount of power to be developed, maintaining the hydrocarbon supply uniform at any given adjustment of the air supply and correcting such correlation by determining the amount of air admitted to the cylinder by the speed of the piston and preventing, by compensating means, the disturbance of such correlation by changes in external air pressure as to insure that the piston speed will draw into the cylinder such amount of air as will furnish an efficient, explosive mixture under all varying external air conditions.

The present invention comprises certain improvements upon the invention disclosed in my prior application for Letters Patent of the United States, Serial Number 518,942, filed November 30, 1921, for Method and apparatus for obtaining work in internal combustion engines. The prior application relates to an internal combustion engine comprising a cylinder, a piston reciprocable therein, a casing presenting a valve opening leading into the passage leading to the cylinder and an air valve opening leading to the atmosphere, an adjustable valve for regulating the area of the former opening, an air valve for the latter opening urged by a constant force towards closing position and moved to open position by the suction of the engine, a hydrocarbon supply, a pipe leading from said hydrocarbon supply to said passage, an adjustable valve for admitting the hydrocarbon from the supply to the pipe and a conduit connecting the chamber in the casing and the pipe at a point between the hydrocarbon valve and the cylinder, by reason of which construction variation in the speed of the piston acts to cause variation in the amount of air entering into the mixture delivered to the cylinder, but such variation in the speed of the piston is prevented from varying the flow of hydrocarbon into
the mixture for any given position of the hydrocarbon admitting valve.

In the preferred embodiment of the invention disclosed in the prior application, the settings of the hydrocarbon valve and of the air valve are simultaneously controlled by a single operating lever, the amount of air passing through the air valve being subject to control by the amount of vacuum created by the speed of the piston. In that construction, means are provided to cause a predetermined, uniform flow of hydrocarbon at any given adjustment, notwithstanding differences in degree of vacuum produced by changes of speed in the piston. The invention disclosed in the prior application, however, contemplates regulation of the mixture supplied to the cylinder under substantially uniform conditions of external pressure of air.

The present invention contemplates a like control of the explosive mixture furnished to the engine under varying conditions of external pressure of air, such as are occasioned when the engine is transported from one altitude to another, also including such changes in pressure of the air external to the cylinder as may be produced artificially, as, for example, by enclosing the carburetor in a casing and subjecting it to artificially created air pressure.

The invention contemplates the provision of compensating means for varying the adjustment of the hydrocarbon valve in such a manner as to maintain a supply to the engine of an efficient, practically uniform, explosive mixture under all running conditions of the engine. It also contemplates the provision of compensating means for adjusting the air valve to produce a like result and preferably, but not necessarily, contemplates means for controlling the hydrocarbon valve and the air valve, respectively, in such a manner that their conjoint action would insure a supply of efficient, practically uniform, explosive mixture to the engine under all running conditions and notwithstanding variations in external air pressure.

The method of operating an internal combustion engine comprising a cylinder and piston in accordance with the present invention, consists more particularly in simultaneously regulating the amount of hydrocarbon and air supplied to the cylinder in approximate correlation to the amount of power to be developed by the engine, and in maintaining the hydrocarbon supply substantially uniform at any given adjustment of the air valve, correcting said correlation by determining or regulating the amount of air admitted to the cylinder by the action of the speed of the piston, and finally, by so compensating the air regulation and the fuel regulation, respectively, against variations in density of the external air as to prevent such variations from materially disturbing the aforesaid correlation.

Further description of the method, and suitable mechanism therefor, will more fully appear from the following description and the accompanying drawings and will be particularly pointed out in the claims.

In the drawings:

Fig. 1 is a front elevation of the manifold of an automobile engine together with a preferred form of apparatus embodying the invention;

Fig. 2 is a side elevation, partially in cross section, of the construction shown in Fig. 1, together with a portion of an automobile engine;

Fig. 3 is a view showing the main features of Fig. 1 in vertical cross section;

Fig. 4 shows a preferred shape of the orifice leading from the air cylinder;

Fig. 5 is a top plan view, partially in horizontal cross section, of a portion of the construction shown in Fig. 1;

Fig. 6 is a detail elevation of a preferred form of compensating device for the fuel-regulating valve;

Fig. 7 is an elevation of a preferred form of compensating device for controlling the air-regulating valve;

Fig. 8 is a diagrammatic view showing a closed casing to enclose the carburetor and in which the carburetor may be maintained under any desired air pressure;

Figure 9:
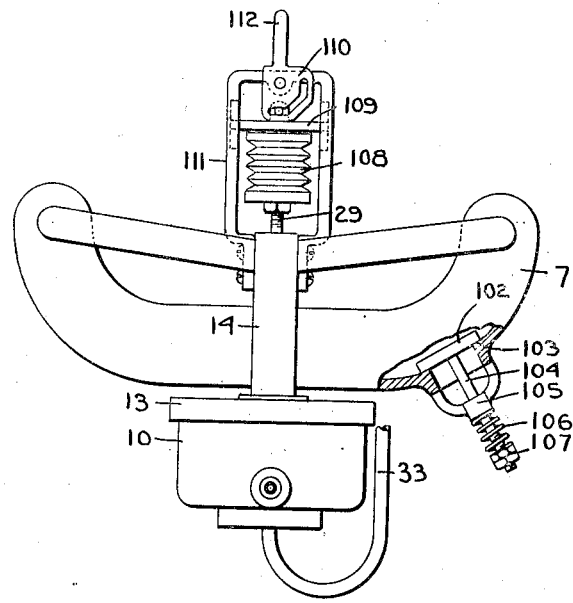
Fig. 9 is an elevation similar to Fig. 1, showing a modified form of apparatus embodying the invention; and, Fig. 10 is a detail view, mainly in vertical section, showing a modified means of maintaining a uniform pressure on the hydrocarbon supplied to the engine.

As the invention is not concerned with the details of the internal combustion engine, it is sufficient to illustrate the engine in a general way. A portion of an ordinary type of automobile internal combustion engine is shown including the cylinder block 1 formed to present the cylinder 2, valve chamber 3, valve 4 and the piston 5 reciprocable in cylinder 2 and transmitting power through the piston rod 6 in the usual manner.

An ordinary type of manifold 7 is shown flanged at its ends and secured by bolts 8 to the engine block. This manifold should preferably be of symmetrical shape with respect to the central vertical axis, and it is herein shown as square in cross section, thus more readily to enable the parts hereinafter described to be connected to it.

The hydrocarbon is supplied through a pipe 9 to a float chamber 10. This float chamber is preferably in the form of an annulus extending between the outer cylindrical casing 11 and a large inner central standard 12. The cylindrical casing 11 of the float chamber casing is carried around to form the bottom of the float chamber and by a driving fit or otherwise is suitably secured to the bottom of the standard 12. The top of the float chamber is covered by a cap 13 threaded onto the cylindrical casing 11. A vertical hollow post 14 is threaded at 15 into the top of the standard 12 and projects up through the cap 13. A float 16 shown as a hollow metal annulus is located in the float chamber and secured to a sleeve 17 freely sliding on the exterior of the standard 12 and guided in its vertical movement by a pin 18 projecting from the standard into a vertical groove 19 in the sleeve. The sleeve is suitably connected to a valve in the hydrocarbon inlet 9 so as to maintain a fixed level of hydrocarbon in the float chamber. In the construction illustrated a bell crank lever 20 is pivoted at 21 on the end of the inlet 22 threaded into the casing 11. This bell crank 20 loosely engages at its inner end a lug 23 on the sleeve 17. The valve 24 has its spindle 25 pivoted at the angle of the bell crank. Hence as hydrocarbon is withdrawn from the float chamber and the float drops the valve 24 is opened and remains opened until the float rises to the predetermined position.

The hydrocarbon passes from the float chamber through a passageway 26 in the standard 12 to a central vertical cylindrical nozzle 27 herein shown as a small sleeve driven into the center of the standard and projecting up into the hollow post 14.

The opening for the egress of the hydrocarbon from the nozzle 27 is controlled by a needle valve shown as a tapered pin 28 on the lower end of a rod 29 extending up through the hollow post, guided in the upper end of the post and pivoted at 30 to a compensating device 31, which in turn is connected to an operating lever. Air sufficient to form with the hydrocarbon a rich mixture is admitted around and below the mouth of the nozzle 27. For this purpose an annular chamber 32 is conveniently formed in the standard 12 around the nozzle 27 and beneath the lower end of the post 14. From this chamber 32 the air passes around the nozzle 27 in an annular space in the post 14 surrounding the rod 29, which rod may be preferably of the same external diameter as that of the sleeve forming the nozzle 27. Air is admitted to the chamber 32 in any suitable manner, as through a pipe 33 extending from the chamber down through the standard 12 and in the form shown bent back into a vertical position and carrying at its upper end a priming cup 34 threaded thereto at 35. The priming cup may be utilized for applying a priming charge as in the case of cold weather or when a relatively non-volatile or low gravity hydrocarbon is being used. The required vacuum at the fuel nozzle is secured in the form illustrated by a valve in the pipe 35. This is shown as a ball 36 seating against the opening 37 into the priming cup and held in position by a light spring 38. This spring is shown located abutting the threaded end of the pipe 35 so that by screwing the priming cup up and down on the pipe the tension exerted by the spring, and consequently the degree of vacuum produced, may be varied.

The rich mixture thus formed by the hydrocarbon passing from the nozzle 27 and the air passing up around the nozzle is transmitted from the hollow post 14 to the manifold. The post 14 is preferably located as shown centrally of the manifold and symmetrically arranged pipes 39 extend therefrom into the manifold and preferably to positions adjacent the openings into the cylinder. While these pipes are herein shown as two in number, they will be of such a number or so arranged as to subdivide the mixture formed in the hollow post 14 and present it in equal amounts to the individual cylinders of the engine. In the construction illustrated, the pipes 39 project into the manifold near the cylinder openings and at their ends flare outward as shown at 40 and are covered with wire gauze 41 to assist in the atomization of the mixture. These pipes thus lead into proximity to the cylinder and carry the hydrocarbon into proximity to the cylinder by which it is meant that these pipes terminate at points in sufficient proximity to the cylinder inlet to prevent deposition of hydrocarbon before the mixture is drawn into the cylinder.

The admission of a separate body of air to the cylinders is provided for by a valve construction herein shown as including a vertically arranged cylindrical casing 42. This casing is formed at the rear with a flange 43 by which it is bolted directly to the front face of the manifold. For convenience of arrangement in the construction illustrated, this casing is set slightly to one side but the passageway 44 therefrom into the manifold is arranged to enter at the center of the manifold so that the air is symmetrically distributed in the manifold.

The casing 42 is provided at the lower end with a valve opening 45 over which is seated a valve 46, the spindle 47 of which projects downwardly through a bracket 48 and is surrounded by a helical spring 49 abutting between the bracket 48 and nuts 50 adjustable on the lower end of the spindle. The adjustment, therefore, of the spring 49 by the nuts 50 in conjunction with the weight of the valve permits of any degree of vacuum being obtained in the cylinder, while the retarding influence due to the inertia of the valve allows, in addition, the hydrocarbon time in which to reach the cylinder and meet the additional charge of air.

The passageway 44 from the cylinder is opened and closed or its effective area varied by a valve shown in the form of a piston 51 sliding in the casing 42 and controlled by a rod 52 projecting up through the head 53 of the casing and pivoted to operating links 54, which in turn are connected by a compensating device to the operating lever.

The valve 51 is balanced by openings 55 extending therethrough. The mouth of the passageway 44 at the inner wall of the cylindrical casing 42 where it is controlled by the valve or piston 51 is preferably shaped somewhat as shown in Fig. 4 to secure a more gradual admission of the air and consequently a more gradual increase in the density of the mixture.

When the piston 51 is moved toward its upper limit, opening the passageway 44 to the full area of opening 45, the valve 46 must lift from its seat sufficiently to provide an area of opening equal to that of the passageway. Consequently the spring 49 must be of such a length that its compression to full opening of the valve 46 will not substantially affect the degree of vacuum at which the valve 46 is set to operate.

The post 14 which supports the float chamber may be held in place as illustrated by means of a flange 56 projecting rearwardly therefrom and bolted at 57 to a projection 58 from the cylindrical casing 42.

The valve rods 29 and 52 may be operated or adjusted by any suitable means to effect a setting of the needle valve 28 and the piston valve 51. In the prior application above identified, the links 31 and 54 extend upwardly and are pivoted respectively to arms 58 and 59 extended from a shaft 60, which is provided with an operating lever 61 that may be controlled manually by a governor, or otherwise, as desired.

In the present invention, compensating means are interposed between the rods 29 and 52 and the arms 58 and 59, respectively, and operate either singly or conjointly, as will hereinafter appear, to vary the settings of the hydrocarbon and air valves, respectively or conjointly, in such a manner as to prevent variations in the density of the external air from materially disturbing the existing correlation of the air and gas supplied to the engine as determined by the speed of the piston.

The air valve 51 is shown with a certain amount of lap at 51$^a$. This permits the changing of the idling mixture upon variations in barometric conditions or fuel quality, for the reason that the air valve 51 can be slightly raised without admitting air to the engine, while such movement, which also raises the needle valve, will permit an increased flow of hydrocarbon, thus enriching the mixture.

The interior of the air cylinder casing 42 is connected with the annular space surrounding the needle valve rod 29 in the post 14 above the nozzle 27 as by a pipe 63. The internal area of each pipe 39, of the annular space between the valve rod 29 and the post 14, of the pipe 33, and of the opening 37 should preferably be the same, and the internal area of the pipe 63 should be at least as large in order to meet the necessary requirements.

Preferably means are provided for admitting water vapor or steam to the mixture and as here shown a pipe 64 extends into the manifold controlled by a valve 65 and may be connected to any point preferably above the water level in the jacket of the engine.

A fine mesh wire screen 66 is shown at the opening from the manifold into the valve chamber and acts further to assist the atomization of the mixture and also to prevent the flame upon backfiring from igniting the mixture in the manifold. A relief valve 67 may also be provided in the manifold to relieve the pressure in the case of backfire.

The pipes 39 which transmit the rich mixture may each be heated as by a suitable water jacket 68. This enables the hydrocarbon to be heated to the desired temperature without heating the entire body of air.

In proportioning the apparatus to a given engine, the effective area of the passageway through the hollow post 14 surrounding the needle valve rod 29 is made such as to limit the amount of mixture that can pass therethrough to that amount of mixture of fixed quality which is required for idling at the desired speed.

The pipe 33 as already pointed out must have an area sufficient to permit a supply of air therethrough past the hydrocarbon nozzle 27 unrestricted save by the area of the passageway through the post 14 already referred to. The area of the pipe 63 is fixed as already pointed out by the requirement that it shall be sufficient to determine the vacuum or pressure in the passageway through the post 14 below its connection therewith and thus prevent any greater suction being transmitted through the pipes 39 affecting the flow of the mixture below this point.

The construction above described insures that when the engine is drawing a charge, there shall be a substantially uniform flow of hydrocarbon through the passageway in the post 14 at any given setting of the needle valve. The phrase "uniform flow" is used herein and in the claims as meaning a flow that will deliver equal amounts of hydrocarbon in equal periods of flow. This flow is determined by the area of the passageway and the pressure producing the flow. The uniform flow of hydrocarbon at any predetermined setting of the hydrocarbon valve requires a corresponding uniform differential between, on the one hand, the pressure of the hydrocarbon inlet, the area of which is fixed by the setting of the hydrocarbon valve, and on the other hand, the pressure on the hydrocarbon supplied to this inlet as in the float chamber. The pressure, in turn, is determined by that existing at the point where the pipe 63 enters the passageway and the pressure existing at the admission end of the pipe 33 subject, of course, to the friction losses occurring in the pipes. The pressure in the pipe 63 is controlled by the spring 49 which, under ordinary circumstances, should be adjusted to produce a small reduction below external air pressure, while the pressure in the pipe 33 is controlled by the spring 38 which should be adjusted to produce a still smaller reduction in external air pressure. This insures that the hydrocarbon shall be sucked out through the nozzle 27 before the ball valve 36 opens and the flow of air commences. As soon as the valve 36 opens, the air drawn through the pipe 33 surrounds the nozzle and carries the hydrocarbon to the cylinder. If at any time the suction produced by the engine tends to produce a pressure in the passageway through the post 14 further below atmospheric pressure than that determined by the spring 49, then the valve 46 will be lifted and air will flow through the pipe 63, thus preventing the reduced pressure from extending down through the hydrocarbon nozzle. Thus when the engine is drawing a charge, a constant vacuum is maintained at the hydrocarbon nozzle under all conditions in speed. In other words, a uniform flow of hydrocarbon for any given position of the needle valve 28 is secured.

The construction and operation of the mechanism heretofore described is similar in all respects to that disclosed in the prior application aforesaid. In the construction disclosed herein, the objects of the present invention are attained by providing compensating means operable by variations in density of the external air to vary the setting either of the hydrocarbon valve or of the air valve, or preferably, the settings of both valves in such a manner as to prevent variations in the density of the external air from disturbing any established proportions of hydrocarbon and air drawn into the cylinder as determined by the settings of the hydrocarbon valve and air valve and by the action of the speed of the piston.

In the illustrative embodiment of the invention shown in the accompanying drawings, One of the compensating devices 31 comprises a pair of preferably cylindrical heads 70 and 71 connected by a corrugated, metallic cylinder 72 of resilient metal and forms with the heads a bellows-like drum. The heads 70 and 71 desirably are provided with hubs 73 and 74, respectively, which extend toward each other and are normally separated a short distance, said hubs acting upon the compression of the drum by external air pressure to prevent it from collapsing. The heads 70 and 71 of the drum desirably are normally maintained separated a predetermined distance by a helical spring 75 which surrounds the hubs 73 and 74 and abuts against the inner faces of the respective heads. The head 70 of the drum is connected to the head 30 of the needle valve by a rod 76 having at its lower end an eye which engages a stud in the bifurcated end of the head 30 of the needle valve. The opposite end of the rod 76 is screw threaded and engages complementary screw threads in the wall of an axial bore in the head 70. A lock nut 77 on the rod 76 may be provided to secure the head in any desired position of adjustment from the rod. The opposite head 71 of the drum likewise is connected to the arm 59 by a rod 78 having a screw threaded end portion which engages complementary threads in the walls of an axial bore in the head 71 of the hub 74. The rod 78 is provided with a lock nut 79 to retain the parts in adjusted position. Preferably the rods 76 and 78 are oppositely screw threaded so that the drum when rotated may act as a turnbuckle to vary the effective length of connection between the needle valve and the arm 59 of the operating lever. The spring 75 of the drum construction thus disclosed may be of such strength that it will yield to variations in external air pressure sufficiently to vary the length of the connection between the arm 59 of the operating lever and the needle valve and thus prevent variations in the density of the external air from disturbing the established correlation between the amount of hydrocarbon and air admitted to the engine as governed by the speed of the piston.

This compensation is produced, for example, when the external air pressure is diminished, as by reason of altitude, by the elongation of the drum under the action of the spring as the air pressure upon the heads of the drum is diminished. Thus the needle valve is forced more closely to its seat than originally set and the amount of hydrocarbon admitted is reduced in correlation to the diminished density of the air which is drawn into the engine by the suction of the piston. The action of the compensating device under the influence of the spring alone may not be sufficient to produce perfect maintenance of such conditions but will, in any event, insure the delivery to the engine of the proper explosive mixture which otherwise would not be possible if the change in external air pressure were considerable.

In order to provide for a more accurate operation of the compensating device, the action of the spring may be supplemented either by fluid pressure greater than atmospheric pressure or by a fluid pressure less than the atmospheric pressure. Means are illustrated in Fig. 6 to provide for either of these conditions. If a pressure is desired within the cylinder greater than atmospheric pressure to supplement the action of the spring, it may be provided by the introduction of compressed air or other gaseous fluid through a port 80 in the head of the cylinder which is controlled by a ball valve 81 which normally is held upon its seat by a light spring 82 contained in a cylindrical screw threaded casing 83 seated in an aperture in the end face of the cylinder and provided with a central port through which the air may be forced upon displacement of the valve. The wall of the port 80 desirably is screw threaded and is to receive the threaded stem of a sealing screw 84, a washer 85 preferably being placed beneath the head of the sealing screw 84 to provide a tight joint.

If, on the other hand, it is desired to vary the action of the spring by a degree of pressure less than the atmospheric pressure, the air may be exhausted from the drum through a port 86, controlled by a ball valve 87 normally lightly retained in its seat by a spring 88 contained in a cylindrical casing 89 screwed into a countersunk recess in the head 71, the casing being provided with a port to permit the air to be drawn therethrough. Desirably a screw threaded plug 90 is provided to close said countersunk recess when the air has been exhausted and a suitable washer 91 interposed between the plug and the head to insure a tight joint. By reason of the construction above described, the action of the spring may be modified, either increased or diminished, by the admission of air or by the exhaustion of air from the drum. Thus the drum may be calibrated to produce the required expansion or contraction corresponding to varying conditions of density of the external atmosphere.

The air admission or piston valve may likewise be provided with a similar compensating device, but in such case the action of the compensating device in response to different densities of the external air must be opposite to that of the compensating device which controls the needle valve.

A preferred form of compensating device, which is illustrated in the drawings, comprises a drum 92, similar in all respects to the drum 31, but with different connections to the valve and arm of the operating lever. In this construction the operating links 54, which are pivotally connected to a rod 93 pivotally mounted in an eye in the head 94 of the piston stem 52, are connected at their opposite ends to a rod 95 which extends across and is secured to the upper head 96 of the compensating drum 92. The lower head 97 of said compensating drum rests upon the end of the arm 58, the opposite end of which is secured to the rock shaft 60 and is actuated simultaneously with the arm 58 by the operating lever 61, or by a governor, or other suitable mechanism, as heretofore described.

The operation of the compensating device for the air or piston valve is equivalent in all respects to the operation of the compensating device for the needle valve as the expansion of the compensating drum 92, under reduced pressure, due to decrease in density of the external air, will act to raise the valve 51 and thereby admit a greater volume of air to the cylinder of the engine while the flow of hydrocarbon remains uniform.

It will be understood that the particular form of compensating devices specifically shown and described herein are of an illustrative character and that other suitable compensating means may be employed in place thereof.

Either of the compensating devices above described may be employed to prevent variations in density of the external air from disturbing the correlation between the amount of hydrocarbon and air supplied to the cylinder as governed by the speed of the piston, or these compensating devices may be used simultaneously and conjointly especially where a wide variation in density of air is likely to be encountered which might make it difficult for either of the individual compensating devices properly to correct, as for example, in cases of engines used in aeroplane work. By employing compensating devices for both the needle valve and the air valve or piston, and properly calibrating such compensating devices to cause the respective drums to lengthen a determined amount under a determined change in external pressure, a far greater range of compensation may be provided and the supply of a substantially uniform and proper mixture to the cylinder of the engine insured under all running conditions of the engine and at all altitudes and under all air pressure conditions. This is accomplished because the compensating device upon the air valve insures the introduction into the cylinder of substantially the same weight of air at all times irrespective of the density of the external air within the possible volume limits of the engine, and the compensating device for the needle valve insures a reduction of the supply of hydrocarbon in proportion to the reduction of the weight of the air introduced into the cylinder through the air valve.

The foregoing description is addressed more particularly to the operation of the engine under atmospheric conditions at different altitudes. The same regulation, however, may be obtained artificially by enclosing a carburetor of the type herein described within a casing and supplying the casing with air under any pressure differing from atmospheric pressure. Such a condition is graphically illustrated in Fig. 8 in which a casing 97 is provided to enclose the carburetor and all the mechanism appertaining thereto heretofore described. This casing must be in communication with the hydrocarbon supply container $97^a$, as by the pipe $97^b$ with a check valve $97^c$ to prevent flow toward the casing, the casing may be integral with or secured to the manifold 98 of the engine and may be provided with a suitable journal for the rock shaft 60 of the operating lever 61 and with suitable connections for the pipe 99 through which hydrocarbon is admitted to the engine and also preferably with an air pipe 100 having a screw threaded periphery to which a suitable pipe 101 may be connected for the purpose of conducting air under any desired pressure into the casing. It will be obvious that the operation of the carburetor and of the compensating devices will be the same as heretofore described as such variations in pressure as may take place will correspond in all respects to variations in pressure due to variations in the density of the atmosphere as heretofore described.

If a carburetor of the character above described, which operates normally with a lean mixture, should be used without a compensating device upon an aeroplane, then with increase in elevation the mixture would get richer and stronger, but less dense so it might be assumed that the explosive force of the mixture is maintained practically constant throughout a considerable rise in elevation. Again, as the back pressure would be reduced, there would be some acceleration which would tend further to enable the piston to draw enough air to secure at least an explosive mixture until some considerable height was attained. Such elevation, would, of course, depend to a considerable extent on the quality of mixture at the start.

If the ordinary quantitatively controlled carburetor having an arbitrary mixture should be started also with a lean mixture then as the air supply became gradually less in density the force of the explosion might again be considered unchanged and there would, with the fall in back pressure, be a certain acceleration also, but as this acceleration would not improve the mixture an engine so equipped could not operate satisfactorily at as high an elevation as in the former case. In either case, however, an adjustment would be finally needed because the continued fall in pressure would reduce the power developed faster than it reduced the resistance.

If the carburetor with the qualitative control is adjusted by lengthening the hydrocarbon valve stem, and thus reducing the amount of hydrocarbon, as soon as the operation of the engine is unsatisfactory and the elevation noted as well as the amount of change made in the length of the stem progressively higher elevations may be attained by further adjustments until the desired maximum height is attained, owing to the greater attenuation of the air and the proportionately reduced hydrocarbon, the compression in the cylinder will have been getting gradually less and therefore the force of the explosions.

If now the several amounts that the valve stem had to be lengthened at various external pressures or elevations are used for data the calibration of the compensating drum for the hydrocarbon valve can be properly executed and the trip duplicated without any manual adjustments whatever. The accuracy of the results desired determine the amount of accuracy required in this process of calibration. The same flexibility of the mixture as to quality does not exist while the density of the air is so much reduced, but the piston speed will here also dictate the best mixture and it will probably be richer than otherwise.

Any slight changes desired in calibration may be effected by pumping a suitable gas into the compensating drum to make it more sensitive, or by reducing the pressure within the drum as the case may be, the requirement being that a given reduction in external pressure shall increase the length of the drum a given amount.

The calibration of the compensating device on the air valve may be effected by varying the external pressure to which it is subjected in the same way or in any other convenient manner. In this case it is, however, necessary to insure that the hydrocarbon valve at maximum opening does not furnish more hydrocarbon than will be used at the maximum altitude, or under the most attenuating air conditions, because the final mixture as to proportions and weights will be the same in each case, owing to the fact that the cylinder volume can only contain a certain weight of air at any given density.

If, however, the carburetor is enclosed in a casing as shown in Fig. 8, the external pressure on the carburetor and hydrocarbon supply will be the same at all times and there will be no limit to the pressure conditions under which the engine would run if the pressure and efficiency of the air at the carburetor is maintained by a pump or other means (not shown).

The carburetor on an aeroplane engine is not usually equipped with means for varying speeds and under such requirements the mechanism of the present invention can be greatly simplified as shown in Fig. 9 of the drawings, in which the air valve is placed on the manifold and there is only one degree of differential between the pressure of the external air and that existing in the manifold and at the hydrocarbon inlet at any time, this degree of differential being determined by the spring which controls the air valve. This spring also determines the vacuum on the gasoline inlet which is controlled by the needle valve equipped with a compensating drum as above described. In this construction the manifold 7, the pipes 39, the post 14, the needle valve 29 and the float chamber 10 with the air inlet 33 thereto, may be the same as heretofore illustrated and described. In this construction, however, the casing 42 with the air valve 46 and its piston 51 are omitted and also the controlling levers 58 and 59. The admission of air into the manifold 7 is controlled by an air valve 102 which co-operates with a valve seat 103 within the casing. The stem 104 of the valve is slidably journalled in a bracket 105 preferably integral with or secured to the casing and is normally urged toward seated position by a helical spring 106 surrounding the valve stem and abutting at one end against the bracket 105 and at the other end engaging lock nuts 107 which are mounted upon the screw threaded end portion of the valve stem. In this case the spring 106 must be of the same type as the spring 49 heretofore described and must be so adjusted that the valve will operate in the same manner as the air valve 46 heretofore described, that is to say, the valve 102 and the spring controlled thereby must be so proportioned that when the valve is wide open enough air can pass therethrough to meet the requirements with maximum speed of the engine without reducing the absolute pressure in the manifold.

The size of the inlet pipe 33 in this construction should be such as to permit the entrance of air to carry the hydrocarbon to the cylinder, but should not be sufficiently large to produce an inspirating effect upon the hydrocarbon. In this construction the air pressure within the manifold and within the pipes which conduct gasolene to the manifold is always maintained at the same constant differential pressure as heretofore described.

The regulation of the setting of the needle valve may be accomplished in a manner similar to that heretofore described by the interposition of a compensating drum 108 between the needle valve and an abutment 109. The position of the abutment 109 may be shifted vertically by any suitable means to set or shift the position of the needle valve. As illustrated, a hand-controlled, slotted cam 110 is pivotally mounted on a frame 111 secured to the post 14, with the cam slot of the cam engaging a stud on the abutment 109 and with the abutment guided in the frame 111. The cam 110 may be set in two or more different positions as may be desired and thus the needle valve set to reduce the amount of hydrocarbon supplied to the mixture to a minimum that will secure an explosive mixture. The air valve also may be so equipped.

The spring 106 should be of such strength as to reduce the pressure as little as possible and the hydrocarbon opening may be made larger so that a very small vacuum will draw the required amount of hydrocarbon to the cylinder. This carburetor will function just as the one hereinbefore described except that it will develop full power all of the time and is much simpler in construction. If modifications in speed should be desirable other than the maximum, such changes may be secured to a modified extent by means of the cam 110.

Figure 10:
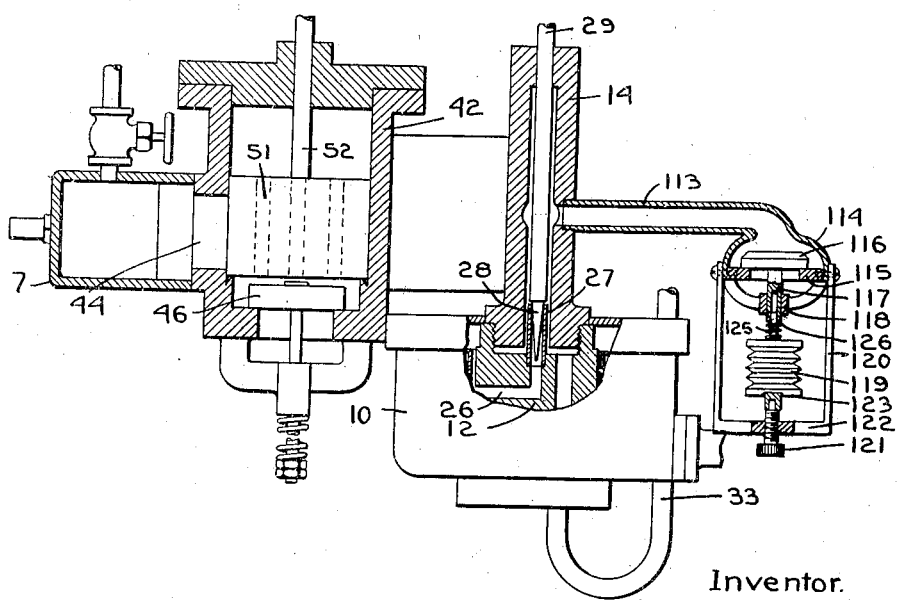

In Fig. 10 a modified form of fluid inlet is graphically illustrated by means of which the pipe 63 in Fig. 3 may be omitted, the remainder of the construction remaining the same. In this construction a pipe 113 is substituted for the pipe 63 and provided with an enlarged bell-shaped end 114 having at its lower end a valve seat 115 which is engaged by a valve 116, the stem 117 of which is mounted in a suitable bearing 118 in a bracket preferably formed integral with the end portion 114 of the pipe. The weight of the valve 116 should be such as to control the maximum degree of vacuum required in the pipe 113 and post 14. The effective weight of this valve may be varied by providing a compensating drum 119 of the character herein described which may be supported upon a suitable bracket or hanger 120 by means of an adjusting screw 121 mounted in a transverse bar 122 of the hanger and engaging the lower head 123 of the drum, the opposite head 124 of the drum being engaged by a spring 125 the opposite end of which spring engages a shoulder 126 on the valve stem 117.

The reduction of pressure upon the drum 119 will cause the drum to expand and, therefore, reduce the effective weight that urges the valve toward its seat, thereby accomplishing the same purpose as heretofore described.

It is obvious that either of the types of carburetor herein disclosed may be used inside a casing such as illustrated in Fig. 8 because their operation is similar, except that one has adjustments for variable speeds over a wider range.

It will be necessary to have the compensating drums calibrated to suit the pressure in the casing and the probable changes in such pressure that may occur. Owing to the greater density of the air, where a pressure greater than normal is used, the amount of hydrocarbon supplied for any given volume of air must be increased either by adjusting the valve controlling the area of the hydrocarbon opening or by changing the differential in pressure at the hydrocarbon inlet, as through the medium of the variation in the tension of the springs 49 or 106, so that there will be enough hydrocarbon to secure an explosive mixture under all conditions of the piston speed. This explosion will, of course, have greater than normal force due to the increased density of the mixture and the increased pressure resulting after compression. The use of such pressure greater than normal permits relatively low grade hydrocarbons, volatilizing under higher pressure, to be used.

While only one device, the check valve $97^c$, has been referred to for taking care of the conditions which arise when the carburetor and hydrocarbon supply are shifted from the normal vertical position, it will be understood that any and all devices that may be or are usually employed to take care of the change from the vertical position, such as occurs in aeroplane flight, may be employed in connection with the present invention. A small opening closed by a plug or screw $97^d$ is shown in the casing 97 to permit volatile hydrocarbon being supplied to the priming cup 34 in starting up an engine to be operated with less volatile grades of hydrocarbon.

Various other modifications in construction may be made within the purview of the invention and it will, therefore be understood that the particular embodiments of the invention shown and described herein are of an illustrative character and are not restrictive, and that various other means may be employed to produce the method and to obtain the results herein described within the meaning and scope of the following claims.

Having thus described the invention, what is claimed as new, and desired to be secured by Letters Patent, is:

1. The method of operating an internal combustion engine comprising a cylinder and a piston reciprocable therein which consists in adjusting the area for the flow of hydrocarbon to the cylinder, in maintaining said flow of hydrocarbon constant between successive adjustments, in determining the amount of air supplied to the cylinder by the speed of the piston and in utilizing variations in pressure of the external air to which the carbureter is subjected to vary the relation of the amount of flow of hydrocarbon and air between successive adjustments to compensate for variations in density of the air.

2. The method of operating an internal combustion engine comprising a cylinder and a piston reciprocable therein which consists in adjusting the area for the air flow to the cylinder, in determining the amount of air supplied to the cylinder by the speed of the piston between successive adjustments, in normally maintaining a uniform amount of flow of hydrocarbon to the cylinder between such adjustments and in utilizing variations in pressure of the external air to which the carbureter is subjected to vary the amount of flow of hydrocarbon between successive adjustments to compensate for variations in the density of the air.

3. The method of operating an internal combustion engine comprising a cylinder and a piston reciprocable therein which consists in adjusting the area for the air flow to the cylinder, in determining the amount of air supplied to the cylinder by the speed of the piston between successive adjustments, in normally maintaining a uniform amount of flow of hydrocarbon to the cylinder between such adjustments and in utilizing variations in pressure of the external air to which the carbureter is subjected to vary the area for the air flow to the cylinder between successive adjustments to compensate for variations in the density of the air.

4. The method of operating an internal combustion engine comprising a cylinder and a piston reciprocable therein which consists in adjusting the area for the air flow to the cylinder, in determining the amount of air supplied to the cylinder by the speed of the piston between successive adjustments, in normally maintaining a uniform amount of flow of hydrocarbon to the cylinder between such adjustments, in varying the amount of flow of hydrocarbon and the area for the air flow simultaneously and in utilizing variations in pressure of the external air to which the carbureter is subjected to vary the relation of the amounts of flow of the hydrocarbon and the air between successive adjustments to compensate for variations in density of the air.

5. The method of operating an internal combustion engine comprising a cylinder and a piston reciprocable therein and an air inlet which consists in adjusting the amount of flow of hydrocarbon and the area of the air inlet simultaneously, in normally maintaining a uniform amount of flow of hydrocarbon to the cylinder between such adjustments, thereby causing the mixture to become leaner with each increase in speed of the piston occurring between such adjustments and in utilizing variations in pressure of the external air to which the carbureter is subjected to vary the amount of flow of hydrocarbon between such adjustments to compensate for variations in density of the air.

6. The method of operating an internal combustion engine comprising a cylinder and a piston reciprocable therein and an air inlet which consists in adjusting the amount of flow of hydrocarbon and the area of the air inlet simultaneously, in normally maintaining a uniform amount of flow of hydrocarbon to the cylinder between such adjustments, thereby causing the mixture to become leaner with each increase in speed of the piston occurring between such adjustments and in utilizing variations in pressure of the external air to which the carbureter is subjected to vary the area of the air inlet to compensate for variations in density of the air.

7. The method of operating an internal combustion engine comprising a cylinder and a piston reciprocable therein and an air inlet which consists in adjusting the amount of flow of hydrocarbon and the area of the air inlet simultaneously, in normally maintaining a uniform amount of flow of hydrocarbon to the cylinder between such adjustments, thereby causing the mixture to become leaner with each increase in speed of the piston occurring between such adjustments and in utilizing variations in pressure of the external air to which the carbureter is subjected to vary simultaneously the amount of flow of the hydrocarbon and the area of the air inlet between such adjustments to compensate for variations in the density of the air.

8. In an internal combustion engine comprising a cylinder, a piston therein and a carburetor therefor including an air valve and a hydrocarbon valve, means acting to insure a uniform flow of hydrocarbon to the cylinder at any predetermined setting of said hydrocarbon valve and compensating means automatically operable by variations in pressure of the external air to which the carbureter is subjected to vary the setting of said hydrocarbon valve in accordance with variations in the density of the external air to regulate the hydrocarbon supply in proportion to the weight of air introduced into the cylinder as governed by the speed of the piston.

9. In an internal combustion engine comprising a cylinder, a piston therein and a carburetor therefor including an air valve and a hydrocarbon valve, means acting to insure a uniform flow of hydrocarbon to the cylinder at any predetermined setting of said hydrocarbon valve and compensating means automatically operable by variations in pressure of the external air to which the carbureter is subjected to vary the setting of said air valve in accordance with the density of the external air to cause the introduction into the cylinder of substantially the same weight of air at each charge of the cylinder at a uniform piston speed.

10. In an internal combustion engine comprising a cylinder, a piston therein and a carburetor therefor including an air valve and a hydrocarbon valve, means acting to insure a uniform flow of hydrocarbon to the cylinder at any predetermined setting of said hydrocarbon valve and compensating means operable by variations in pressure of the external air to which the carbureter is subjected acting respectively upon the hydrocarbon valve and the air valve to vary the settings of said valves in accordance with variations in the density of the external air.

11. In an internal combustion engine comprising a cylinder, a piston therein and a carburetor therefor including an air valve and a hydrocarbon valve, means acting to insure a uniform flow of hydrocarbon to the cylinder at any predetermined setting of the hydrocarbon valve, means to reduce the proportion of hydrocarbon in the mixture in accordance with increases of the piston speed and compensating means operable by variations in pressure of the external air to which the carbureter is subjected to vary the setting of said hydrocarbon valve in accordance with variations in the density of the external air and thereby to reduce the supply of hydrocarbon in proportion to the weight of air introduced into the cylinder.

12. In an internal combustion engine comprising a cylinder, a piston therein and a carburetor therefor including an air valve and a hydrocarbon valve, means acting to insure a uniform flow of hydrocarbon to the cylinder at any predetermined setting of the hydrocarbon valve, means to reduce the proportion of hydrocarbon in the mixture in accordance with increases of the piston speed and compensating means operable by variations in pressure of the external air to which the carbureter is subjected to vary the setting of said air valve in accordance with variations in the density of the external air to cause the introduction into the cylinder of an amount of air, the weight of which is in substantially uniform proportion to the hydrocarbon introduced into the cylinder.

13. In an internal combustion engine comprising a cylinder, a piston therein and a carburetor therefor including an air valve and a hydrocarbon valve, means acting to insure a uniform flow of hydrocarbon to the cylinder at any predetermined setting of the hydrocarbon valve, means to reduce the proportion of hydrocarbon in the mixture in accordance with increases of the piston speed and compensating means operable by variations in pressure of the external air to which the carbureter is subjected acting respectively upon the hydrocarbon valve and the air valve to vary the settings of said valves in accordance with variations in the density of the external air.

14. In an internal combustion engine comprising a cylinder, a piston therein, and a carburetor therefor, including an air valve and a hydrocarbon valve, an operating lever, means respectively connecting said operating lever to said air valve and said hydrocarbon valve operable to effect simultaneous settings of said valves to produce an explosive mixture containing sufficient hydrocarbon for the demand of the engine, means governed by the speed of the piston acting to regulate the amount of air admitted while maintaining the flow of hydrocarbon uniform for any setting of said valves and compensating means in the connection of said operating lever to the hydrocarbon valve operable by variations in the density of the external air to prevent such variations in density from materially affecting the proportions of the mixture.

15. In an internal combustion engine comprising a cylinder, a piston therein, and a carburetor therefor, including an air valve and a hydrocarbon valve, an operating lever, means respectively connecting said operating lever to said air valve and said hydrocarbon valve operable to effect simultaneous settings of said valves to produce an explosive mixture containing sufficient hydrocarbon for the demand of the engine, means governed by the speed of the piston acting to regulate the amount of air admitted while maintaining the flow of hydrocarbon uniform for any setting of said valves and compensating means in the connection of said operating lever to the air valve operable by variations in the density of the external air to vary the setting of the air valve to prevent such variations in density from materially affecting the proportions of the mixture.

16. In an internal combustion engine comprising a cylinder, a piston therein, and a carburetor therefor, including an air valve and a hydrocarbon valve, an operating lever, means respectively connecting said operating lever to said air valve and said hydrocarbon valve operable to effect simultaneous settings of said valves to produce an explosive mixture containing sufficient hydrocarbon for the demand of the engine, means governed by the speed of the piston acting to regulate the amount of air admitted while maintaining the flow of hydrocarbon uniform for any setting of said valves and compensating means in the connections between said operating lever and the hydrocarbon valve and air valve respectively, operable in reverse directions by variations in the density of the external air to vary the respective settings of said air and hydrocarbon valves to prevent such variations from materially affecting the proportions of the mixture.

17. In an internal combustion engine comprising a cylinder, a piston, a hydrocarbon supply and a carburetor therefor, including an air valve and a hydrocarbon valve, means acting to insure a uniform flow of hydrocarbon to the cylinder at any predetermined setting of said hydrocarbon valve, a casing enclosing the carburetor, means for forcing air into said casing, means for producing the same pressure on the hydrocarbon supply as in the casing, and compensating means operable by the pressure of the air within said casing for varying the setting of the hydrocarbon valve in accordance with the variations in the pressure of the air in the casing.

18. An internal combustion engine comprising a cylinder, a piston reciprocable therein, means presenting an inlet for the air and an inlet for the hydrocarbon for supplying the mixture to the cylinder, means for setting the position of the elements which determine the flow of hydrocarbon through the hydrocarbon inlet so as normally to render said flow uniform at any existing area of the air inlet and means for adjusting simultaneously the area of the air inlet and the amount of flow of hydrocarbon through the hydrocarbon inlet without disturbing said setting, thereby to establish a different, but uniform flow of hydrocarbon for each area of air inlet, while allowing the amount of air supplied through the air inlet to be determined by the speed of the piston and means operable by variations in pressure of the external air to which the carbureter is subjected for automatically varying the flow of hydrocarbon between such adjustments to compensate for variations in the density of the air.

19. An internal combustion engine comprising a cylinder, a piston reciprocable therein, means, presenting an inlet for the air and an inlet for the hydrocarbon, for supplying the mixture to the cylinder, means for setting the position of the elements which determine the flow of hydrocarbon through the hydrocarbon inlet so as normally to render said flow uniform at any existing area of the air inlet and means for adjusting simultaneously the area of the air inlet and the amount of flow of hydrocarbon through the hydrocarbon inlet without disturbing said setting, thereby to establish a different, but uniform, flow of hydrocarbon for each area of air inlet, while allowing the amount of air supplied through the air inlet to be determined by the speed of the piston and means operable by variations in pressure of the external air to which the carbureter is subjected for automatically varying the area of the air inlet between such adjustments to compensate for variations in the density of the air.

20. An internal combustion engine comprising a cylinder, a piston reciprocable therein, means presenting an inlet for the air and an inlet for the hydrocarbon for supplying the mixture to the cylinder, means for setting the position of the elements which determine the flow of hydrocarbon through the hydrocarbon inlet so as normally to render said flow uniform at any existing area of the air inlet and means for adjusting simultaneously the area of the air inlet and the amount of flow of hydrocarbon through the hydrocarbon inlet without disturbing said setting, thereby to establish a different, but uniform, flow of hydrocarbon for each area of air inlet, while allowing the amount of air supplied through the air inlet to be determined by the speed of the piston and means operable by variations in pressure of the external air to which the carbureter is subjected acting respectively and simultaneously to vary the amount of flow of hydrocarbon and the area of the air inlet to compensate for variations in density of the air.

In testimony whereof, I have signed my name to this specification.

JOSEPH G. PROSSER.